United States Patent
Rivera

(10) Patent No.: US 10,455,972 B2
(45) Date of Patent: Oct. 29, 2019

(54) BEVERAGE BREWER WITH BREWING ROTATION

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 403 days.

(21) Appl. No.: 15/345,056

(22) Filed: Nov. 7, 2016

(65) Prior Publication Data

US 2017/0127874 A1    May 11, 2017

Related U.S. Application Data

(60) Provisional application No. 62/251,568, filed on Nov. 5, 2015.

(51) Int. Cl.
| | |
|---|---|
| *A47J 31/00* | (2006.01) |
| *A47J 31/44* | (2006.01) |
| *A47J 31/40* | (2006.01) |
| *A47J 31/06* | (2006.01) |
| *A47J 31/36* | (2006.01) |
| *A47J 31/22* | (2006.01) |

(52) U.S. Cl.
CPC ....... *A47J 31/4403* (2013.01); *A47J 31/0673* (2013.01); *A47J 31/3695* (2013.01); *A47J 31/407* (2013.01); *A47J 31/22* (2013.01)

(58) Field of Classification Search
CPC ........ A47J 31/0673; A47J 31/20; A47J 31/22; A47J 31/369; A47J 31/3695
USPC ........................................ 99/287, 295, 302 C
See application file for complete search history.

(56) References Cited

U.S. PATENT DOCUMENTS

| | | | | |
|---|---|---|---|---|
| 5,472,719 A | * | 12/1995 | Favre | A47J 31/0673 426/112 |
| 5,957,035 A | * | 9/1999 | Richter | A23F 5/26 426/433 |
| 7,322,274 B2 | * | 1/2008 | Wang | A47J 31/4407 99/280 |
| 7,353,751 B2 | * | 4/2008 | Takizawa | A47J 31/057 99/287 |
| 8,857,317 B2 | * | 10/2014 | Manser | A23L 33/40 99/289 R |
| 2009/0280219 A1 | * | 11/2009 | Yoakim | B65D 85/8043 426/77 |
| 2014/0202338 A1 | * | 7/2014 | Remo | A47J 31/0673 99/295 |

(Continued)

FOREIGN PATENT DOCUMENTS

| | | | | |
|---|---|---|---|---|
| EP | 2119383 A1 | * | 11/2009 | ............. A47J 31/22 |
| EP | 2133008 A1 | * | 12/2009 | ........... A47J 31/0668 |

OTHER PUBLICATIONS

WO 2013/160269 (Parentes et al.) Oct. 2013.*

*Primary Examiner* — Reginald Alexander
(74) *Attorney, Agent, or Firm* — IP Strategies

(57) ABSTRACT

A coffee maker includes an injection needle producing a dispersed spray and a rotating brewing chamber. The brewing chamber may include rollers for rotating a brewing cartridge and a centered extraction needle, or may include a rotating cradle including one or more offset extraction needles. The injection needle includes radially oriented ports providing the dispersed spray into the cartridge interior. As the cartridge is rotated, the dispersed spray prevents or reduces the formation of channels or clumping of the brewing material thus providing better extraction of brewed beverage from the brewing material.

12 Claims, 4 Drawing Sheets

(56) References Cited

U.S. PATENT DOCUMENTS

2015/0099045 A1* 4/2015 Perentes ................ A47J 31/22
426/425
2015/0327718 A1* 11/2015 Burrows .................. A23F 3/18
426/115

* cited by examiner

BEVERAGE BREWER WITH BREWING ROTATION

CROSS-REFERENCE TO RELATED APPLICATIONS

The present application claims the priority of U.S. Provisional Patent Application Ser. No. 62/251,568 filed Nov. 5, 2015, which application is incorporated in its entirety herein by reference.

BACKGROUND OF THE INVENTION

The present invention relates to beverage brewing and in particular to a rotating water dispersion into a brewing chamber.

Brewed beverages are often prepared by injecting water into a brewing chamber containing a brewing material such as ground coffee beans. Various configurations are known including inserting a needle into the brewing material, streams of water injected down into the brewing material. Unfortunately, water released or sprayed into the brewing material may form channels or packets, and the brewed beverage is not uniformly extracted from the brewing material.

BRIEF SUMMARY OF THE INVENTION

The present invention addresses the above and other needs by providing a coffee maker which includes an injection needle producing a dispersed spray and a rotating brewing chamber. The brewing chamber may include rollers for rotating a brewing cartridge and a centered extraction needle, or may include a rotating cradle including one or more offset extraction needles. The injection needle includes radially oriented ports providing the dispersed spray into the cartridge interior. As the cartridge is rotated, the dispersed spray prevents or reduces the formation of channels or clumping of the brewing material thus providing better extraction of brewed beverage from the brewing material.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1C:
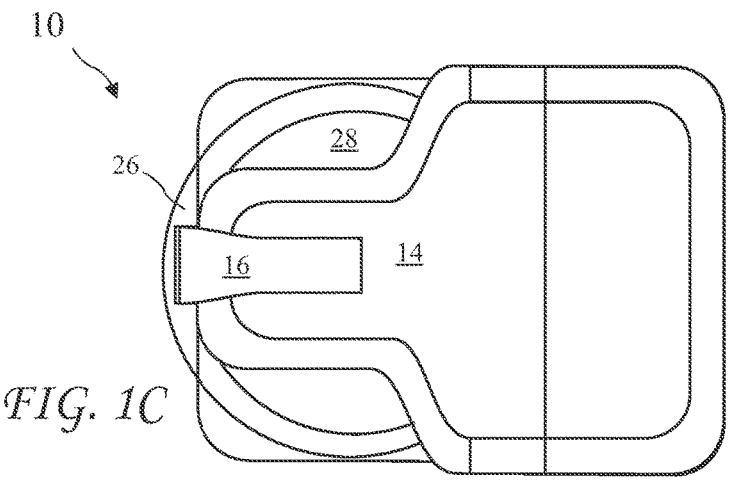
FIG. 1C is a top view of the coffee maker according to the present invention.
Figure 1A:
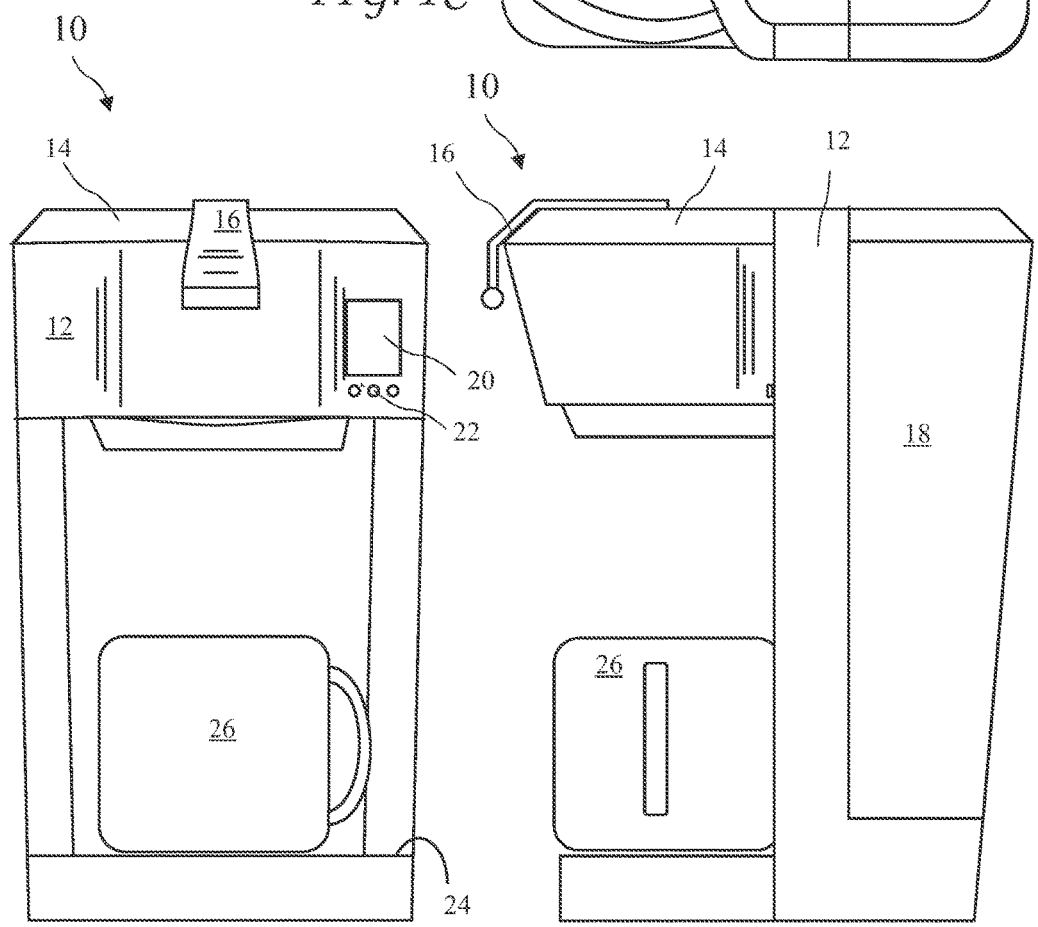
FIG. 1A is a front view of a coffee maker according to the present invention.
Figure 1B:
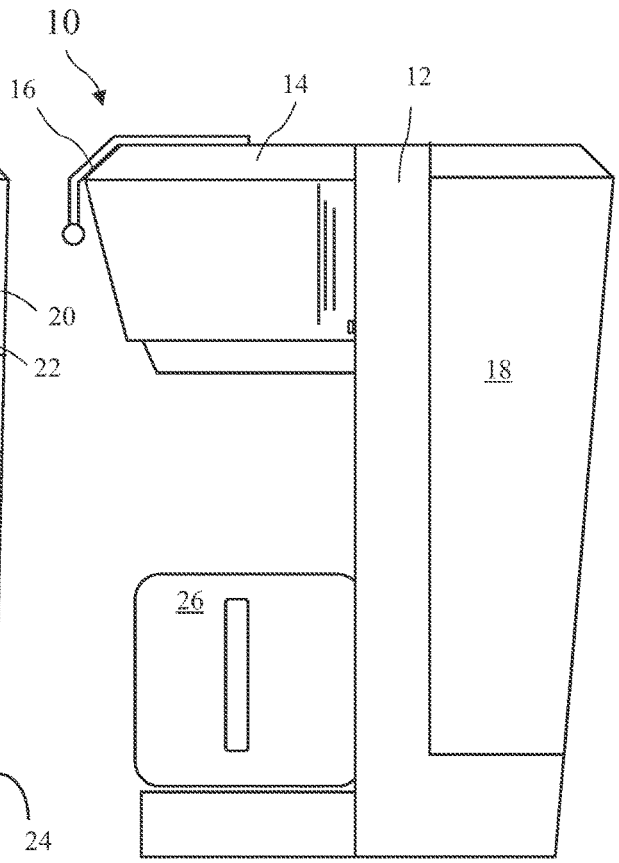
FIG. 1B is a side view of the coffee maker according to the present invention.

A front view of a coffee maker 10 according to the present invention is shown in FIG. 1A a side view of the coffee maker 10 is shown in FIG. 1B, and a top view of the coffee maker 10 is shown in FIG. 1C. The coffee maker 10 includes a base 12, an opening lid 14, a lid handle 16, a water container 18, a display 20, controls 22, and platform 24. A cup 26 rests on the platform 24. The coffee maker 10 provides a flow of hot water through brewing material to produce a brewed drink. The flow of water may be heated by one of any known means, for example, an electrical heating coil, inductive heating, or a conductive coating on tubing carrying the water.

Figure 2A:
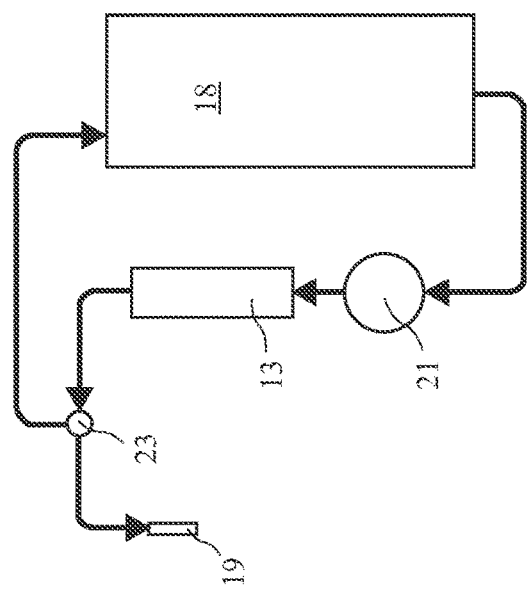
FIG. 2A is a functional diagram of the coffee maker according to the present invention.
Figure 2:
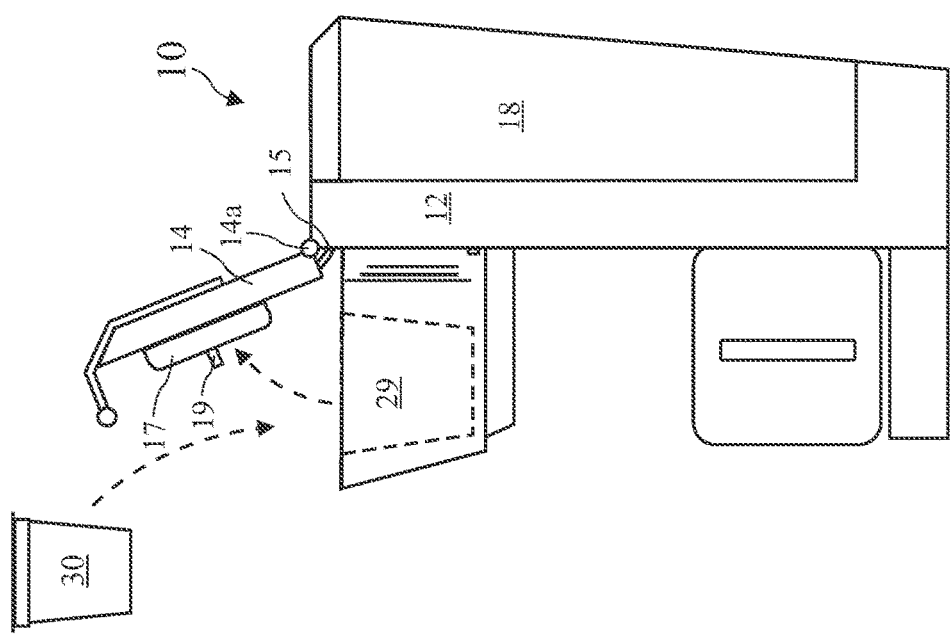
FIG. 2 is a side view of the coffee maker according to the present invention with an open lid allowing placement of a brewing cartridge inside the coffee maker.

A side view of the coffee maker 10 with an open lid 14 allowing placement of a brewing cartridge 30 according to the present invention inside a brewing chamber 29 of the coffee maker 10 is shown in FIG. 2. The lid 14 includes a lid hinge 14a and a water tube 15 carries heated water into the lid 14. A pad 17 resides on a bottom surface of the lid 14 and presses against the brewing cartridge 30 when the lid 14 is closed, urging the brewing cartridge 30 into the brewing chamber 29 and further may provide sealing against the brewing cartridge 30. A needle 19 extending down from the closed lid 14 directs the flow of hot water into the brewing cartridge 30.

A functional diagram of the coffee maker 10 is shown in FIG. 2A. The preferred coffee (or brewing material) maker 10 includes the water tank 18, water pump 21, a heater 13, check valve 23 and the needle 18. The pump 21 preferably provides at least one PSI water pressure. The water heater 13 may include a heating coil, inductive heating, or a resistive coating or any other means for heating water. The check valve 23 limits the water pressure at the needle 19 by returning some of the water flow to the water tank 18. While the water pump 21 is a preferred method for providing a flow of water to the needle 19, other methods include placing the water in the water tank 18 under pressure, and a coffee maker using any means to provide a forced flow of water is intending to be within the scope of the present invention.

The brewing chamber 29 is preferably configured to accept a sealed brewing cartridge sold under the trademark K-CUP which include a top puncture needle for injecting pressurized water into the brewing cartridge, and a bottom puncture needle for puncturing the brewing cartridge to release brewed beverage. Such brewing cartridges are described in U.S. Pat. No. 5,325,765, incorporated herein by reference in its entirety.

Figure 3:
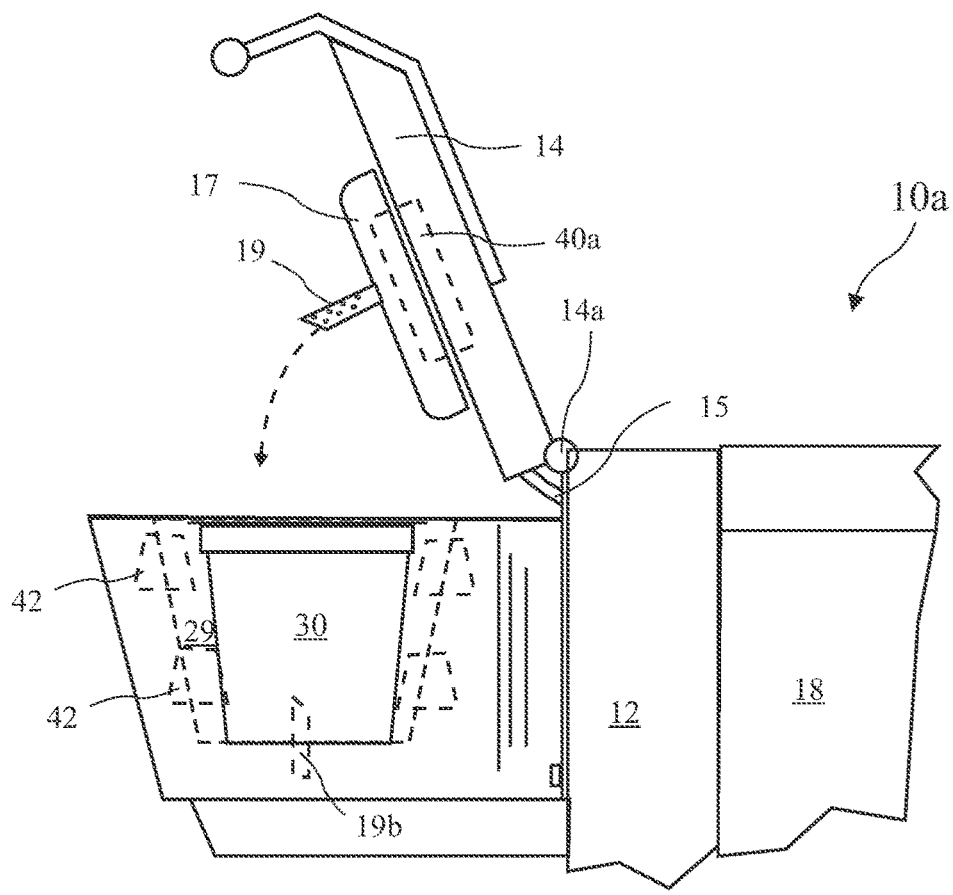
FIG. 3 shows a coffee maker according to the present invention including a motor in the lid for rotating the brewing cartridge.

A top portion of a coffee maker 10a including a motor 40a in the lid 14 for rotating the brewing cartridge 30 is shown in FIG. 3. The motor 40a may rotate the pad 17, or some other rotating member pressed against the brewing cartridge 30 when the lid 14 is closed. Rollers 42 in the brewing chamber 29 facilitate rotation of the brewing cartridge 30. A bottom extraction needle 19b is centered in the brewing chamber 29 to avoid resisting rotation of the brewing cartridge 30.

Figure 4:
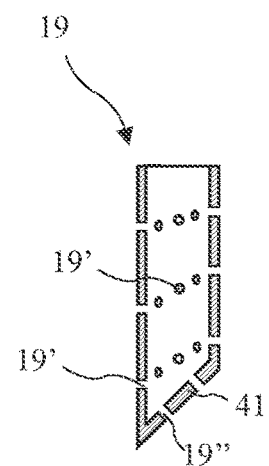
FIG. 4 shows an injection needle having a plurality of dispersion ports.

An injection needle 19 having a plurality of dispersion ports 19' is shown in FIG. 4. The injection needle 19 has a mostly closed bottom 41 which also preferably includes angled dispersion ports 19". The injection needle 19 punctures the brewing cartridge 30 and disperses sprays of water into brewing material in the brewing cartridge 30.

Figure 5:
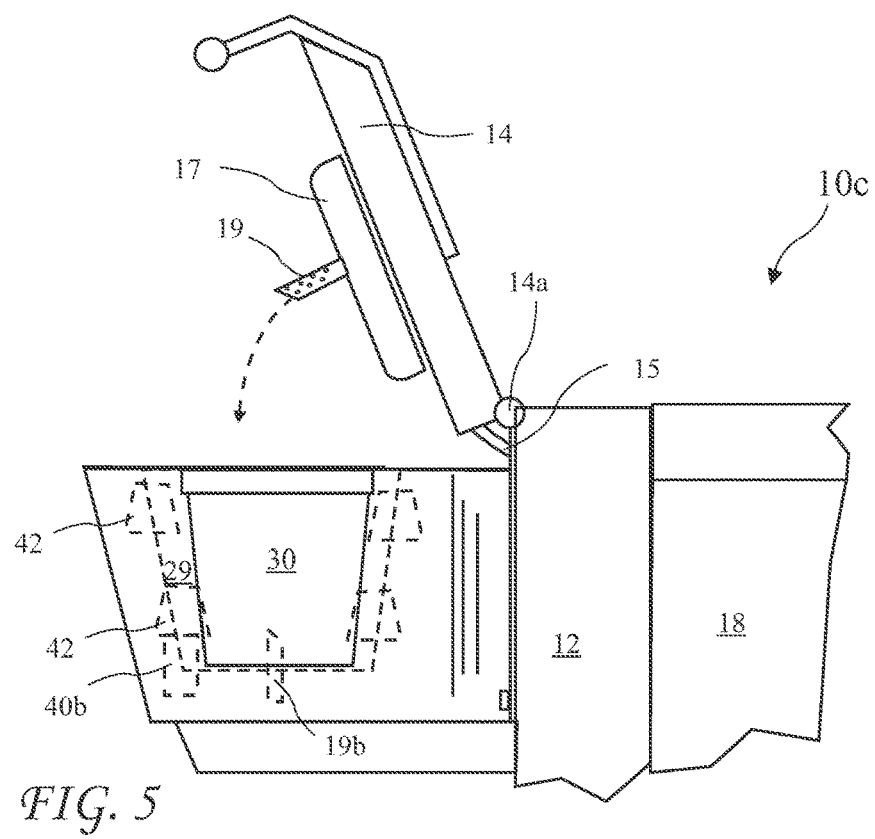
FIG. 5 shows a coffee maker according to the present invention including a motor connected to rollers supporting the brewing cartridge for rotating the brewing cartridge.

A coffee maker 10c including at least one motor 40b connected to the rollers 42 is shown in FIG. 5. The coffee maker 10c is similar to the coffee maker 10a, with the exception of the motor 40b and driven rollers 42 replacing the motor 40a.

Figure 6:
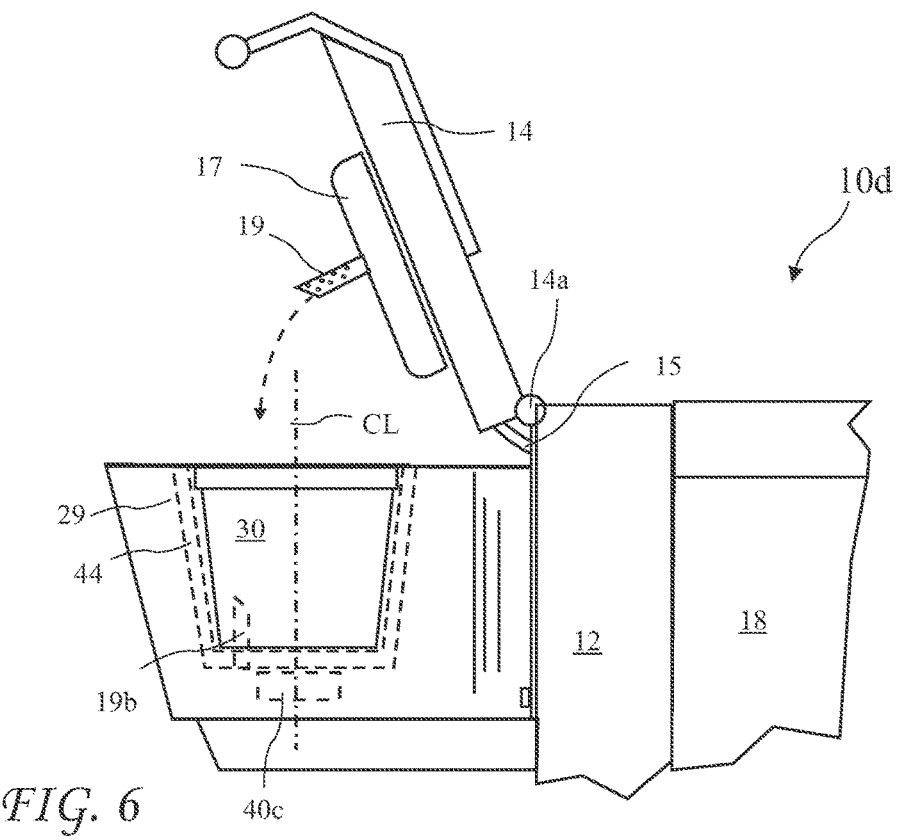
FIG. 6 shows a coffee maker according to the present invention including a motor rotating to a cradle holding the brewing cartridge.

A coffee maker 10d including a motor 40c rotating to a cradle 44 holding the brewing cartridge 30 is shown in FIG. 6. A bottom extraction needle 19b may be a single needle centered on a centerline CL of the cradle 44 and fixed to the coffee maker 10d, or the bottom extraction needle 19b may be one or more needles either centered or offset from the centerline CL of the cradle 44 and fixed to rotate with the cradle 44.

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising;
   a stationary brewing chamber having an open end, a sidewall, and a closed end opposite the opening, configured to receive and support a sealed brewing cartridge;
   an injection needle arranged in fluid communication with a liquid supply and configured to puncture a brewing cartridge disposed in the brewing chamber and to provide fluid communication from the liquid supply to an interior of the brewing cartridge;
   a rotating member arranged at a periphery of the brewing chamber;
   a motor configured to rotate the rotating member; and
   a lid configured to selective cover the open end of the brewing chamber;
   wherein the rotating member includes a pad attached to the lid and arranged to press on the brewing cartridge when the brewing cartridge is disposed in the brewing chamber and the lid covers the open end of the brewing chamber; and
   wherein the pad is configured to rotate the brewing cartridge within the brewing chamber.

2. The beverage brewer of claim 1, wherein the motor is disposed in the lid.

3. The beverage brewer of claim 1, wherein the injection needle extends through a center of the pad and into an interior of the brewing chamber when the lid covers the open end of the brewing chamber.

4. The beverage brewer of claim 1, further comprising an extraction needle arranged at the closed end of the brewing chamber and configured to puncture the brewing cartridge when disposed in the brewing chamber and to provide fluid communication from the interior of the brewing cartridge to an exterior of the brewing chamber, wherein the extraction needle is centrally disposed with respect to the closed end of the brewing chamber.

5. A beverage brewer, comprising:
   a stationary brewing chamber having an open end, a sidewall, and a closed end opposite the opening, configured to receive and support a sealed brewing cartridge;
   an injection needle arranged in fluid communication with a liquid supply and configured to puncture a brewing cartridge disposed in the brewing chamber and to provide fluid communication from the liquid supply to an interior of the brewing cartridge;
   a rotating member arranged at a periphery of the brewing chamber;
   a motor configured to rotate the rotating member; and
   wherein the rotating member includes a roller disposed at the sidewall of the brewing chamber such that at least a portion of the roller extends within an interior of the brewing chamber and is arranged to press against the brewing cartridge when the brewing cartridge is disposed in the brewing chamber, thereby rolling when the brewing cartridge rotates.

6. The beverage brewer of claim 5, wherein the roller is frustoconical in shape.

7. The beverage brewer of claim 5, wherein the rotating member includes a plurality of said rollers.

8. A beverage brewer, comprising:
   a stationary brewing chamber having an open end, a sidewall, and a closed end opposite the opening, configured to receive and support a sealed brewing cartridge;
   an injection needle arranged in fluid communication with a liquid supply and configured to puncture a brewing cartridge disposed in the brewing chamber and to provide fluid communication from the liquid supply to an interior of the brewing cartridge;
   a rotating member arranged at a periphery of the brewing chamber; and
   a motor configured to rotate the rotating member;
   wherein the rotating member includes a roller disposed at the sidewall of the brewing chamber such that at least a portion of the roller extends within an interior of the brewing chamber and is arranged to press against the brewing cartridge when the brewing cartridge is disposed within the brewing chamber; and
   wherein the roller is configured to contact and rotate the brewing cartridge within the brewing chamber.

9. The beverage brewer of claim 8, wherein the roller is frustoconical in shape.

10. The beverage brewer of claim 8, wherein the rotating member includes a plurality of said rollers.

11. The beverage brewer of claim 8, wherein the motor is disposed in a body of the beverage brewer.

12. The beverage brewer of claim 8, further comprising an extraction needle arranged at the closed end of the brewing chamber and configured to puncture the brewing cartridge when disposed in the brewing chamber and to provide fluid communication from the interior of the brewing cartridge to an exterior of the brewing chamber, wherein the extraction needle is centrally disposed with respect to the closed end of the brewing chamber.

* * * * *